BEST AVAILABLE COPY

May 12, 1936. P. M. BOURDON Re. 19,969

PNEUMATIC TIRE

Original Filed April 5, 1935

INVENTOR.
Pierre Marcel Bourdon,
BY Bogue, Neary & Campbell,
HIS ATTORNEYS

Reissued May 12, 1936

BEST AVAILABLE COPY

Re. 19,969

UNITED STATES PATENT OFFICE 19,969

DESIGN FOR A PNEUMATIC TIRE

Pierre Marcel Bourdon, Paris, France, assignor to Michelin & Cie, Clermont-Ferrand, France, a corporation of France Original No. 97,255, dated October 22, 1935, Serial No. 56,220, April 5, 1935, for 7 years. Application for reissue February 13, 1936, Serial No. 61,141. Term of patent 7 years

*To all whom it may concern:*

Be it known that I, Pierre Marcel Bourdon, a citizen of the French Republic and a resident of Paris, France, have invented a new, original, and ornamental Design for a Pneumatic Tire, of which the following is a specification, reference being had to the accompanying drawing, forming a part thereof.

Figures 1, 2:
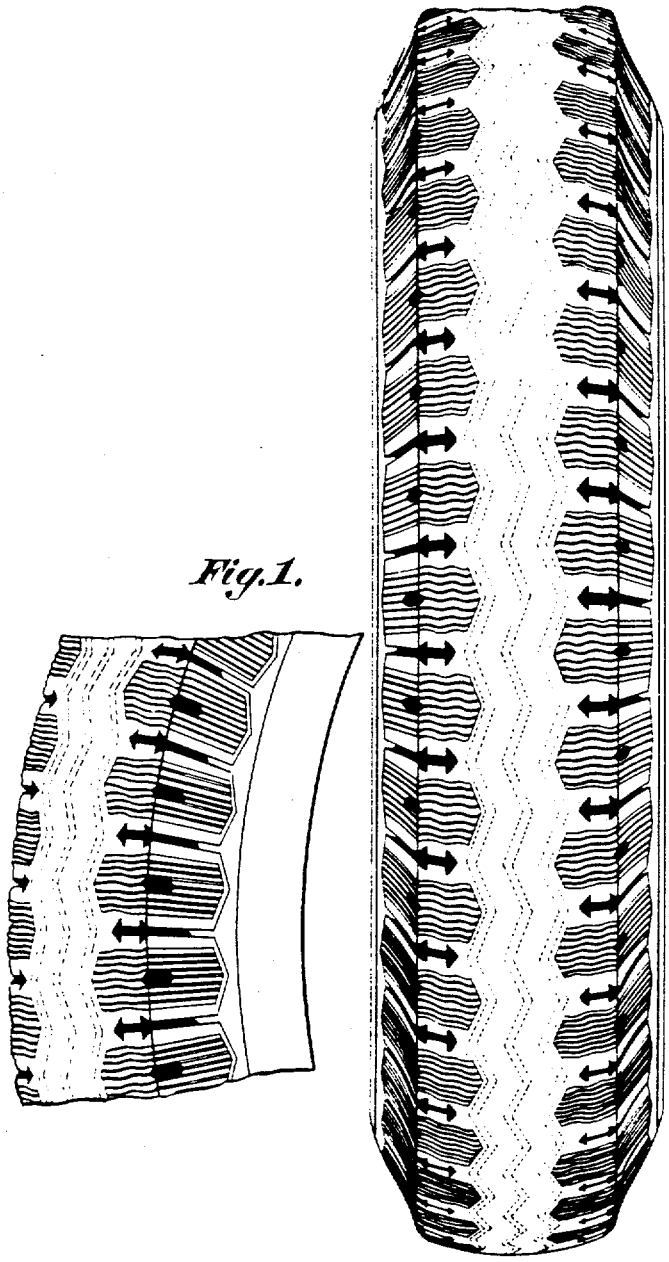
Figure 1 is a fragmentary perspective view of a pneumatic tire, showing my new design.
Figure 2 is a fragmentary top plan view.

I claim:

The ornamental design for a pneumatic tire as shown.

PIERRE MARCEL BOURDON.